Aug. 7, 1962    R. C. DARNELL    3,048,276
STACK TYPE FILTER CONSTRUCTION
Filed July 11, 1958
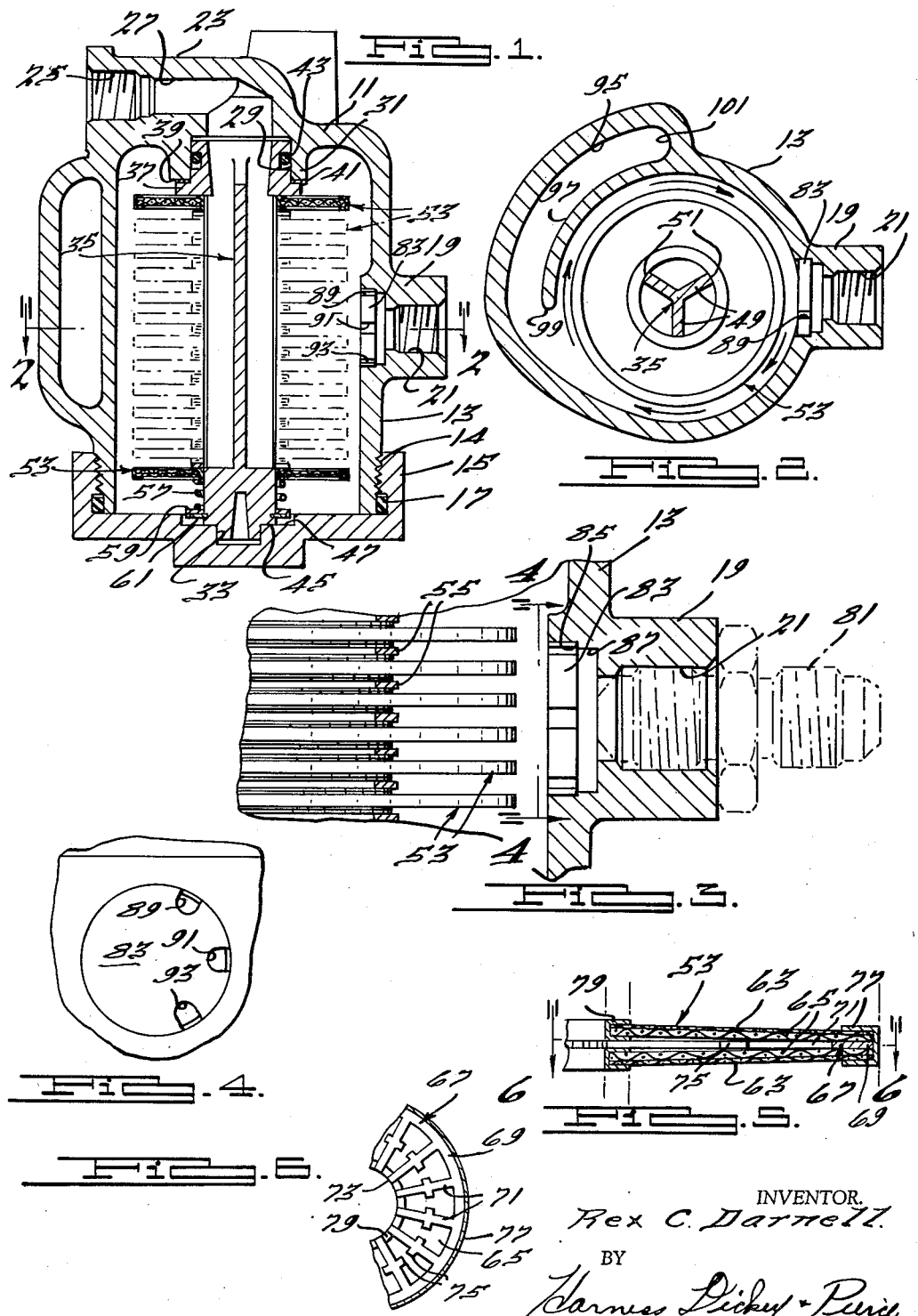
INVENTOR.
Rex C. Darnell
BY
Barnes, Dickey & Pierce
ATTORNEYS.

United States Patent Office 3,048,276
Patented Aug. 7, 1962

3,048,276
STACK TYPE FILTER CONSTRUCTION
Rex C. Darnell, Dexter, Mich., assignor to Dynamic Filters Inc., Detroit, Mich., a corporation of Michigan
Filed July 11, 1958, Ser. No. 748,034
2 Claims. (Cl. 210—304)

This invention relates to filtering devices and particularly to filtering devices of the type employing a housing containing a stack of filtering discs through which liquid is passed to separate rust, lint, sand, dirt and similar undesired contaminating matter from the liquid.

Stack type filter units customarily use a plurality of separate filtering discs stacked on a central spindle within a housing, each of the discs carrying filtering screens or media on opposite sides thereof and disposed transversely of the filter stack. The filtering screens of adjacent units are spaced lengthwise of the filter stack from each other so that liquid can flow therebetween as a means of access to or egress from the filtering media surfaces. This general type of construction offers the advantage of presenting an extremely large area of screen or other filtering media surface to the contaminated liquid for a housing of a given limited size. The maximization of filtering media surface area within the unit is desirable in view of the fact that the contaminating particles filtered by the unit accumulate on the surface of the filtering media and increase the resistance of the unit to liquid flow. The greater the surface area available, the greater will be the ability of the filtering media to store contaminants on their surfaces without becoming completely plugged. Even in the absence of complete plugging, the build-up of contaminants may ultimately cause a pressure drop in excess of the operational requirements of the system in which it is used, and care must be taken to replace or clean the filter stack prior to this time.

Excessive pressure drop is a particularly critical matter in the field of aircraft fuel filtration. Should the filter become clogged, the pressure in the fuel line could be reduced below the point necessary to adequately feed fuel to the engine and engine failure could result. Further, the ability of the filter to be used for a long period of time without requiring servicing is a distinct advantage in aircraft fuel filtration.

While increasing the filtering media surface area in a stack type filter increases the period for which it may be used without servicing and also diminishes its tendency to cause large pressure drops in pressurized flow systems, considerations of size, weight and cost limit the screen area which may be feasibly built into such a filter unit. Accordingly, it is an object of the present invention to provide a stack type filter unit having an increased effective life between servicings without increasing the total screen area of the unit.

It is another object of the present invention to provide a stack type filter unit which may be operated over a substantial period of time without greatly increasing its resistance to liquid flow and thus creating a large pressure drop, due to clogging of the unit with contaminant.

It is another object of the present invention to provide a stack type filtering unit having means for continuously scouring or cleaning some of the filtering media in order to keep a portion of the total filter screen area free from accumulated contaminant for the unimpeded passage of liquid therethrough.

A further object of the present invention is to provide a filtering unit of the above character in which the contaminated liquid is rapidly rotated or circulated within the unit in order to cleanse the filter discs and cause the contaminant particles in the fluid to be thrown outwardly away from the filter discs under the influence of centrifugal force.

It is a still further object of the present invention to provide a filtering unit of the above character having a storage chamber remote from the filter screens in which a substantial percentage of the contaminant particles are deposited, thereby reducing the tendency of screens to become plugged with contaminant matter.

It is an additional object of the present invention to provide a filtering unit of the above character which is sturdy in construction, inexpensive of manufacture and which may be easily disassembled for cleaning and maintenance.

Other objects and advantages of the present invention will become apparent from the following detailed description taken in conjunction with the accompanying drawings, in which FIGURE 1 is a vertical section through a filtering unit embodying the principles of the present invention, the individual filter discs being shown in broken lines;

FIG. 2 is a sectional view of the structure illustrated in FIG. 1 taken along the line 2—2 thereof;

FIG. 3 is an enlarged view of a portion of the structure illustrated in FIG. 1, the individual filter discs being shown in elevation;

FIG. 4 is a view of the structure illustrated in FIG. 3 taken along the line 4—4 thereof;

FIG. 5 is an enlarged sectional view of a portion of an individual filter disc; and FIG. 6 is a sectional view of the structure shown in FIG. 5 taken along the line 6—6 thereof.

Referring now to the drawings, FIG. 1 illustrates a generally cup-shaped housing 11 having a substantially cylindrical side wall 13 which is threaded at 14 in order to threadably receive a cover member 15. An O-ring 17 is provided between the cover 15 and the housing 11 to seal the closure therebetween. A boss 19 is formed on the side wall 13 of the housing 11, and has a threaded bore or inlet port 21 communicating with the interior of the housing. The housing 11 has an enlarged upper end 23 formed with a threaded outlet bore or port 25 and a communicating inlet channel 27. The inlet channel 27 leads to a bore 29 which is formed in a boss 31 on the inner surface of the housing upper end 23. The bore 29 is open to the interior of the housing 11 and liquid is free to flow therefrom to the outlet port 25.

The cover member 15 is provided with a blind bore 33 at the center of its inside surface for the purpose of supporting one end of an elongated spindle 35, the other end of which is supported in the bore 29. The upper end of the spindle 35, as viewed in FIG. 1, is provided with a radial flange 37 arranged to seat against a shoulder 39 formed around the bore 29, with an annular seal member 41 disposed therebetween. In addition, the upper end of the spindle 35 carries an O-ring 43 which sealingly engages the wall of the bore 29. The lower end of the spindle 35 is provided with a shoulder 45 which abuts a shoulder 47 formed in the bore 33. Thus, the spindle 35 is held against lengthwise movements by the shoulders 39 and 47.

The major length of the spindle 35 comprises three radial ribs 49 set 120° apart. Stacked on the spindle 35 and supported on the peripheries 51 of the ribs 49 are a plurality of separate filtering discs or units 53 which are centrally apertured in order to receive the spindle 35. The discs 53 are substantially parallel and are disposed transversely to the spindle 35. A spacing washer 55 is disposed between each of the filter discs 53 in order to space the filter discs 53 apart longitudinally of the spindle 35. The uppermost filtering disc 53, as viewed in FIG. 1, abuts the flange 37 formed on the upper end of the spindle 35. The filter disc stack is held in abutting assembly by a coil spring 57 which is disposed around the lower end of the spindle 35 and is seated against an annular washer member 59 held in position by a snap ring 61 fastened on the spindle 35.

The details of each filtering disc are most clearly shown in FIG. 5, which is a sectional view through one-half of a filtering disc. Each disc is made up of a pair of fine, mesh wire screens 63 on opposite sides thereof and each is backed by a coarser supporting screen 65. Both the screens 63 and 65 are annular in shape and the screens 65 lie on opposite sides of a central, flat sheet metal spacing member 67. The spacer member 67 includes an outer ring portion 69 having a plurality of integral radially inwardly extending spoke portions 71. The inner or free ends 73 of the spoke portions 71 are spaced equally from the center of the spacer 67 and circumferential clearance exists therebetween. Each spoke 71 is provided with a pair of ears 75 projecting outwardly from either side thereof at approximately its midlength. The ears 75 assist the spoke 71 in supporting and reinforcing the screens 65. The discs are maintained in assembled relationship by means of an outer binder 77, which is an annular piece of metal bent to a U-shaped cross section, and a pair of inner binders 79. The inner binders 79 are also annular rings of U-shaped cross section, and each is disposed on an opposite side of the spacer 67 where it binds the adjacent screens 63 and 65 together. The free ends 73 of the spokes 71 lie between the pair of inner binders 79 of each disc 53, while the spacing washers 55 engage the inner binders 79 on the outside thereof. Under the bias of the spring 57 the inner binders 79 tightly engage the washers 55 adjacent thereto and the entire filtering disc stack is maintained in assembly on the spindle 35.

Due to the fact that the spacing washers 55 provide clearance between the filtering discs, fluid entering the housing from the inlet port is free to flow between the adjacent filtering discs. From this location the liquid flows through the screens 63 and 65 and thence toward the spindle 35 between the spokes 71. Upon passing between the free ends 73 of the spokes the liquid is then free to flow in the longitudinal channels provided by the spacing between the ribs 49. These channels lead to the bore 29 which communicates with the outlet port 25. Due to the extremely fine wire mesh of the screens 63 contaminant particles contained in the liquid are separated therefrom and clean liquid emerges from the outlet port. As is the tendency in any retention or barrier-type filter, the contaminating matter separated from the liquid tends to accumulate on the surfaces of the filtering media or screens. The build up of the contaminant on the screens 63 can eventually clog them and prevent the liquid from flowing therethrough. In order to reduce this tendency, the filtering device of the present invention is provided with novel means for cleansing the filtering discs of the contaminant tending to accumulate thereon.

FIG. 3 illustrates a typical fitting or coupling 81 screwed into the inlet port 21. Covering the inlet port 21 at its juncture with the inner side wall of the housing 11 is a slotted nozzle disc 83 which is seated against a shoulder 85 formed by counterboring the inlet port 21. The disc 83 is spaced from the end of the coupling 81 and a chamber 87 is formed for mixing of the incoming liquid prior to its passage through the disc 83. The disc 83 is circular in shape and has three slots, 89, 91 and 93 extending in from its periphery in locations spaced 60° apart. As may be seen in FIG. 4 the slot 89 is offset 30° from the top of the disc while the slot 91 is offset 90° from the top and the slot 93 is offset 150° from the top.

Expressed in the terms of a clock, the slots 89, 91 and 93 are located at one o'clock, three o'clock and five o'clock, respectively. The diameter of the disc is such that the slots are disposed laterally opposite the spaces between three pairs of discs 53. The combined cross sectional area of the slots 89, 91 and 93, compared to the cross sectional area of the mixing chamber 85 is substantially less than the mixing chamber 85, and the slots 89, 91 and 93 function as nozzles to shoot the incoming liquid into the housing 11 in the form of a high velocity jet spray.

The liquid spraying out of the slots or orifices 89, 91 and 93 scours the exposed surfaces of the screens 63 and washes away the contaminant particles which tend to accumulate on the screens due to the passage of liquid therethrough. The jet stream which continually plays upon the surfaces of the six outer screens 63 lying along the path of the incoming liquid assures that these screens will be maintained relatively unobstructed by accumulated contaminant particles—at least until the housing becomes substantially filled with contaminant.

As may be seen in FIG. 2, the inlet port 21 is disposed radially opposite the spindle 51 which is, in turn, disposed on the axis of the cylindrical side wall 13 of the housing 11. It will be noted that all of the slots 89, 91 and 93 are formed on one side of the disc 83 and thus face in a direction to one side of this axis. As a consequence, incoming liquid flows to the left of the spindle 51, as viewed in FIG. 2, and then in a clockwise direction around the spindle. It will thus be seen that this off-center relationship of the orifices or slots to the vertical centerline of the filter stack creates a rotary or swirling action of the liquid within the housing 11. This swirling action creates a cross wash which tends to cleanse the surfaces of the filtering discs not directly in the path of the liquid blast coming from the disc 83. In addition, the swirling action throws the contaminant cleansed from the screen surfaces of the filter discs 53 radially outwardly to the annular chamber between the housing side wall 13 and the stack of filtering discs 53, thereby removing the contaminant particles from intimate contact with the filtering discs.

In order to accommodate the contaminant particles thrown outwardly by the swirling liquid, a contaminant storage chamber 95 is formed in the housing 11. A portion of the housing side wall 13 serves as a separating rib 97 between the interior filter stack area and the storage chamber 95 and terminates in a free end 99. That portion of the side wall 13 opposite the free end 99 curves outwardly in order to provide a space or opening for admission of the contaminant particles into the storage chamber 95. The contaminant particles, which travel in a clockwise direction, are thus free to pass by the free end 99 and into the storage chamber 95 which is located outwardly of the separating rib 97. The storage chamber 95 ends in an end wall 101 against which contaminant particles are thrown. It will thus be seen that the continued rotation of liquid in a clockwise direction (as viewed in FIG. 2) tends to maintain the contaminant within the storage chamber and prevents its re-entry into the filter disc area.

The filter unit of the present invention may be conveniently disassembled for cleaning or other servicing periodically during its life. After disconnection of the fittings from the inlet and outlet ports 21 and 25. the housing 11 may be removed from the system in which it is used. By unscrewing of the end cover member 15 and withdrawal of the spindle 35 from the bore 29 the entire stack of filtering discs 53 may be withdrawn from the assembly. By unfastening of the lock ring 61 and removal of the washer 59 and spring 57 from the spindle 35 the discs 53 may be removed one at a time and either cleaned in a cleaning fluid of light viscosity or discarded and replaced by new discs. The contaminant storage chamber 95 may then be flushed out in order to remove the contaminating foreign matter contained therein. The unit is then reassembled by the reverse of the above procedure.

By way of example and not for purposes of limitation, the performance characteristics of a filter unit made in accordance with the principles of the present invention may be cited to illustrate the results possible. The unit of this example had filter discs 53 which were 1⅞ inches in diameter and the screens 63 were of a 33 micron mesh. The slots 89, 91 and 93 of the disc 83 were each .0069 square inch in cross sectional area, for a total orifice of .0207 square inch. With 2 g.p.m. of liquid flowing through the unit, the velocity of the liquid entering the housing was computed at 32 feet per second. Assuming the liquid rotates within the housing at this speed, the centrifugal force acting upon the contaminant particles at a mean radius of .625 inch would be 610 G's. While the rotational speed of the liquid within the housing may be somewhat less than this figure due to the frictional forces present, it will be readily apparent that a sufficiently high centrifugal force exists to throw contaminant particles within the liquid outwardly away from the filtering discs 53. In the operation of the filtering unit of this example it was found that the washing of the filter discs 53 and deposition of contaminant matter in the storage chamber away from the discs effectively increased the service life of the entire device by approximately 100 percent.

It is appreciated that any constriction in a liquid conduit creates friction and other turbulent influences which resist the flow and that, therefore, the nozzle disc 83 in and of itself effects a pressure drop in the system in which the device is utilized. However, due to th operation of the nozzle disc 83, the subsequent pressure drop during usage of the filtering unit is substantially reduced. For example, in testing the particular unit mentioned above, with the slotted nozzle disc 83 removed it was found that the initial pressure drop in the system due to the filtering device was 5 pounds p.s.i. After 20 hours of operation with liquid of a given contamination saturation, this pressure drop increased to 40 pounds p.s.i. By inserting the nozzle disc 83 the initial pressure drop due to the entire device was found to be 20 pounds p.s.i. However, after the same 20 hours of operation with contaminated liquid the entire pressure drop had only increased to approximately 22 pounds p.s.i. Thus, if ΔP were plotted against time, the resulting curve in the case where the nozzle disc 83 was used would be substantially flatter than the curve in the case where it was omitted. If we assume that the filtering device is to be used in a system in which any pressure drop greater than 30 pounds p.s.i. will impair the system's operation, it may be seen that the device could be used for a substantially longer period of time without servicing by the use of the nozzle disc 83.

While the invention has been illustrated as embodying separate discs 53 it should be appreciated that the filtering media may be successfully connected at their inner or outer diameters or otherwise joined, so that no separate discs are identifiable. This and other details of the preferred embodiment of the invention illustrated herein are susceptible to modification, variation and change without departing from the proper scope or fair meaning of the subjoined claims.

What is claimed is:
1. A filtering device for liquid including a housing having a generally cylindrical enclosing side wall provided with an inlet opening, a stack of spaced filtering media disposed in said housing and having a longitudinal axis disposed coaxially with respect to said side wall, said filtering media being arranged perpendicularly to said side wall and having their outer peripheries adjacent to and spaced from said side wall to provide an annular space between said stack and said side wall, means associated with said inlet opening providing a plurality of restricted orifices disposed in the planes of the spaces between at least some of said filtering media to direct incoming liquid in high velocity streams across portions of the faces of the adjacent ones of said filtering media, said orifices being arranged to direct said streams in paths offset from the axis of said stack and spaced from said side wall to both directly scour contaminant from the filtering media surfaces in alignment therewith and to impart a high degree of rotation to liquid in said annular space.

2. A filtering device for liquids including a housing having a generally cylindrical enclosing side wall provided with an inlet opening, a stack of spaced filtering media disposed in said housing and having a longitudinal axis disposed coaxially with respect to the axis of said side wall, said filtering media being arranged perpendicularly to said side wall and having their outer peripheries adjacent to and spaced from said side wall to provide an annular space between said stack and said side wall, a member fitted in said housing in the path of fluid entering said housing from said inlet opening, said member having a plurality of restricted orifices disposed in the planes of a relatively few of the spaces between adjacent ones of said filtering media to direct incoming liquid in high velocity streams across portions of the faces of the filtering media bounding said relatively few spaces, said orifices being arranged to direct said streams in paths offset from the axis of said side wall and spaced radially inwardly of said side wall to both directly scour the filtering media spaces in alignment therewith and to impart a relatively high rate of rotation to liquid in said annular space, and a contaminant repository for receiving contaminant separated from the rotating liquid in said annular space.

References Cited in the file of this patent
UNITED STATES PATENTS

| | | |
|---|---|---|
| 550,583 | Brinckman et al. | Dec. 3, 1895 |
| 630,363 | Krause | Aug. 8, 1899 |
| 1,175,948 | French | Mar. 21, 1916 |
| 2,068,048 | Adams | Jan. 19, 1937 |
| 2,521,107 | Wiley | Sept. 5, 1950 |
| 2,708,521 | Saloum | May 17, 1955 |
| 2,797,812 | Gaubatz | July 2, 1957 |